United States Patent
Zapf et al.

(10) Patent No.: US 11,807,172 B2
(45) Date of Patent: Nov. 7, 2023

(54) MOLDED PART

(71) Applicant: NOVEM Car Interior Design GmbH, Vorbach (DE)

(72) Inventors: Manuel Zapf, Eckersdorf (DE); Johannes Crux, Bayreuth (DE)

(73) Assignee: NOVEM CAR INTERIOR DESIGN GMBH, Vorbach (DE)

( * ) Notice: Subject to any disclaimer, the term of this patent is extended or adjusted under 35 U.S.C. 154(b) by 337 days.

(21) Appl. No.: 16/925,153

(22) Filed: Jul. 9, 2020

(65) Prior Publication Data
US 2021/0009049 A1  Jan. 14, 2021

(30) Foreign Application Priority Data
Jul. 10, 2019  (DE) .......................... 102019118683.8

(51) Int. Cl.
*B60R 13/02*  (2006.01)
*G01D 11/28*  (2006.01)
(Continued)

(52) U.S. Cl.
CPC .............. *B60R 13/02* (2013.01); *B32B 33/00* (2013.01); *B60Q 3/00* (2013.01); *B60Q 3/64* (2017.02);
(Continued)

(58) Field of Classification Search
CPC .............. B32B 33/00; B32B 2307/414; B32B 2451/00; B32B 2457/20; B32B 3/263;
(Continued)

(56) References Cited

U.S. PATENT DOCUMENTS

2015/0022994 A1* 1/2015 Bingle .................. G01D 13/20
362/23.01
2019/0001637 A1* 1/2019 Ito ......................... B32B 27/306
(Continued)

FOREIGN PATENT DOCUMENTS

DE  202015106546 U1  12/2016
DE  202016104100 U1  8/2017
(Continued)

OTHER PUBLICATIONS

Machine translation of JP 2003-127283 via EPO (Year: 2003).*
Machine translation of JP H054310 via EPO (Year: 1993).*

*Primary Examiner* — Laura C Powers
*Assistant Examiner* — Rebecca L Grusby
(74) *Attorney, Agent, or Firm* — Workman Nydegger

(57) ABSTRACT

A molded part having a front side of the molded part designed as a visible side, comprising a decorative layer having a front side and a rear side opposite the front side, a carrier arranged on the rear side of the decorative layer, and a functional layer arranged on the front side of the decorative layer. The functional layer is or comprises an electrical display element, wherein the electrical display element is designed, in a switched-on operating state, for displaying a surface image and/or for realizing a display function, and/or for realizing an illumination function on the visible side of the molded part, and wherein the electrical display element is at least largely transparent and/or translucent when the operating state is switched off, so that the front side of the decorative layer is visible through the functional layer on the visible side of the molded part.

11 Claims, 2 Drawing Sheets

(51) Int. Cl.
*B60Q 3/64* (2017.01)
*B60Q 3/00* (2017.01)
*B32B 33/00* (2006.01)

(52) U.S. Cl.
CPC ........ *G01D 11/28* (2013.01); *B32B 2307/414* (2013.01); *B32B 2451/00* (2013.01); *B32B 2457/20* (2013.01); *B60R 2013/0287* (2013.01)

(58) Field of Classification Search
CPC .......... B32B 3/30; B60K 35/00; B60K 37/04; B60K 2370/1523; B60K 2370/332; B60K 2370/336; B60K 2370/339; B60K 2370/34; B60Q 3/00; B60Q 3/14; B60Q 3/20; B60Q 3/54; B60Q 3/60; B60Q 3/64; B60R 13/02; B60R 2013/0287; F21V 33/00; G09F 9/30; G09F 13/08
See application file for complete search history.

(56) References Cited

U.S. PATENT DOCUMENTS

| | | | |
|---|---|---|---|
| 2021/0029234 A1* | 1/2021 | Gao | B32B 3/263 |
| 2021/0083028 A1* | 3/2021 | Zhou | H01L 51/56 |
| 2022/0111731 A1* | 4/2022 | Zhao | B60K 37/06 |
| 2022/0176821 A1* | 6/2022 | Hart | G02F 1/133509 |

FOREIGN PATENT DOCUMENTS

| | | |
|---|---|---|
| DE | 202017105057 U1 | 8/2018 |
| DE | 202017105063 U1 | 8/2018 |
| DE | 202017105880 U1 | 9/2018 |
| DE | 202017105883 U1 | 9/2018 |
| JP | H054310 A * | 1/1993 |
| JP | 2003127283 A * | 5/2003 |

* cited by examiner

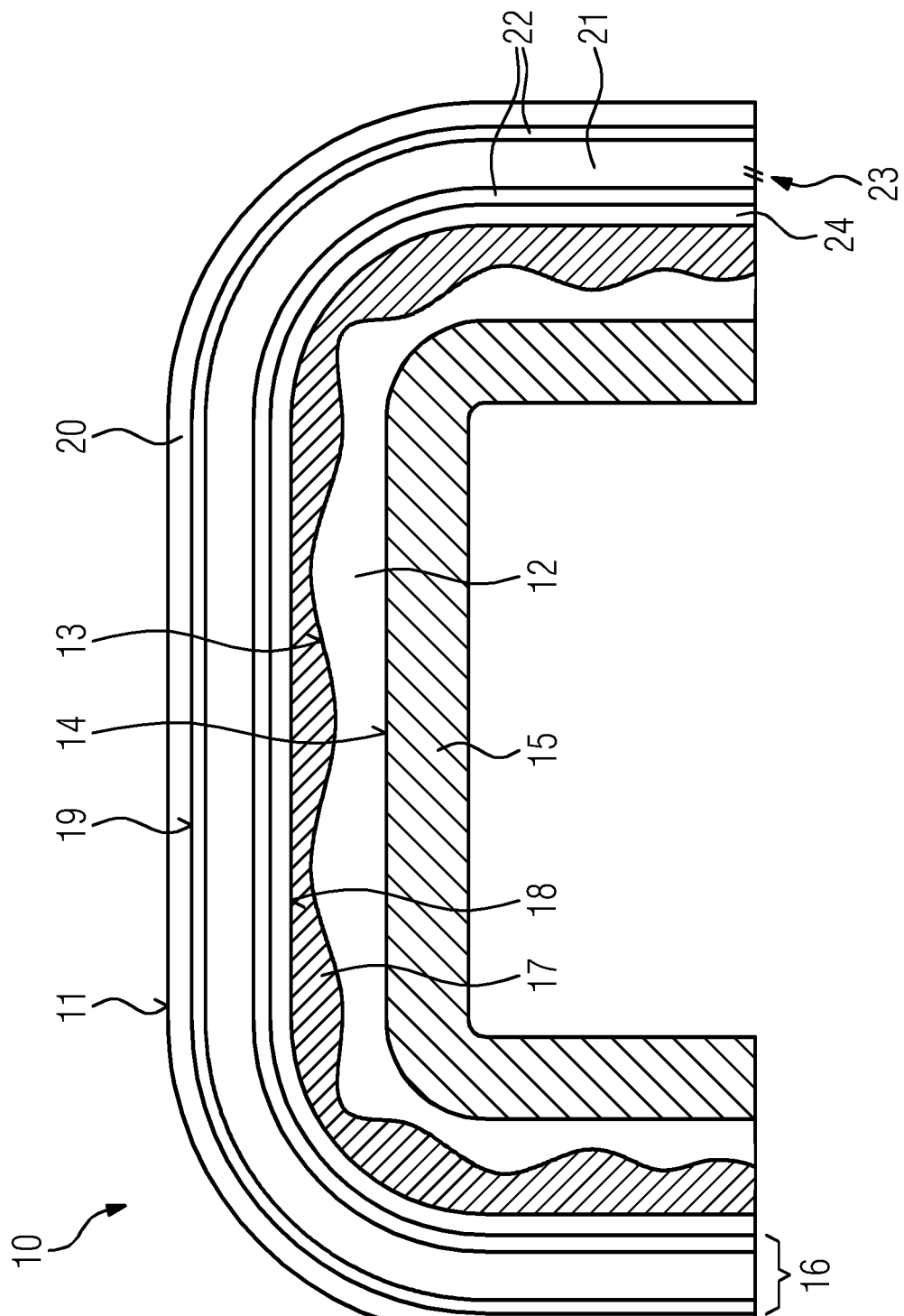

MOLDED PART

CROSS-REFERENCE TO RELATED APPLICATIONS

The present invention claims the benefit of and priority to German Patent Application No. 10 2019 118 683.8, filed on Jul. 10, 2019. The entire content of the aforementioned patent application is incorporated herein by reference.

BACKGROUND OF THE INVENTION

1. The Field of the Invention

The invention relates to a molded part, in particular a decorative part and/or panel part designed as a molded part for a vehicle interior.

2. Background and Relevant Art

Numerous decorative and panel parts are installed in the vehicle interior, such as door panels, console panels, and instrument panels. The decorative and panel parts also include control buttons and their covers.

Such molded parts have a front side of the molded part designed as a visible side and comprise a decorative layer, in particular a wood veneer and/or aluminum and/or fabric, having a front side and a rear side opposite the front side, a carrier arranged on the rear side of the decorative layer, and a functional layer arranged on the front side of the decorative layer.

The requirements for such molded parts are constantly increasing. There is also a particular desire to provide molded parts in which not only a decorative surface is visible on the front side of the molded part, but also further optics and visualization options.

BRIEF SUMMARY

The invention is therefore based on the object of specifying a novel molded part, in particular a molded part which at least largely meets the above requirements.

This object is achieved by the features of claim 1. Advantageous refinements and developments are specified in the respective dependent claims.

The molded part according to the invention is characterized in that the functional layer is or comprises an electrical display element, wherein the electrical display element is in a switched-on operating state for displaying a surface image and/or for realizing a display function, and/or for realizing a preferably ambient illumination function on the visible side of the molded part, and wherein the electrical display element is at least largely transparent and/or translucent when the operating state is switched off, so that the front side of the decorative layer is visible through the functional layer on the visible side of the molded part.

A surface image can be understood to mean, for example, a pattern and/or a lettering and/or a symbol, and/or a structure, and/or a flat color representation, and/or a flat color change.

The advantages of the invention are, in particular, that additional surface images, such as designs and/or symbols and/or structures, and/or colors, and/or color changes, can be represented on the front side of the molded part by means of the electrical display element. These surface images can be switched on and off by the invention, whereby a second design view is created in addition to the decorative layer. By activating the electrical display element, the desired surface images appear on the front side of the molded part. If the electrical display element is switched off, the decorative layer can be seen.

The decorative layer preferably has an irregular surface structure on its front side, a transparent or translucent leveling layer being arranged on the front side of the decorative layer to compensate for the irregular surface structure of the decorative layer. "Irregular" is preferably understood to mean that the front side of the decorative layer is at least partially three-dimensional in relation to the substantially smooth surface of the front side of the molded part, for example by means of elevations or depressions on the front side of the decorative layer.

The leveling layer is preferably provided between the decorative layer and the functional layer in order to form a smooth substrate surface for the functional layer with the front side of the leveling layer.

According to one embodiment variant of the invention, a, preferably transparent or translucent, adhesion layer is provided on the front side of the leveling layer as an adhesion promoter between leveling layer and functional layer.

It can further be provided that a transparent or translucent protective and/or optical layer, in particular a protective lacquer or a protective film, is arranged on the front side of the functional layer, wherein the front side of the protective and/or optical layer preferably form the front side of the molded part.

According to an embodiment variant of the invention, the functional layer comprises an electrical display element and one or more additional plies, the electrical display element being arranged on the front side of the one or more additional plies of the functional layer, wherein the electrical display element extends partially or completely over the front side of the one or more additional plies of the functional layer.

Furthermore, it can be provided that the functional layer comprises an electrical display element and at least two additional plies, wherein the electrical display element is arranged between the at least two additional plies of the functional layer, wherein the electrical display element extends partially or completely over the front side of an additional ply and on the rear side of another additional ply of the functional layer. For example, two additional plies can also be arranged on the front side and/or rear side of the electrical display element.

A development of the invention provides that the at least one, in particular two, additional plies is an electrically conductive ply.

It is further provided that the functional layer is or comprises a functional film and/or a functional glass, the functional film and/or the functional glass having or forming an electrically conductive layer. The electrically conductive layer can be or can be formed, in particular by additive or subtractive application, from conductive material, for example vapor-deposited indium tin oxide, graphene, silicene, or mesh made from copper, gold, or silver.

The functional layer preferably comprises at least one connection element for applying current to the functional layer, in particular for supplying power to the electrical display element. The at least one connection element is preferably provided on or in one or the electrically conductive plies of the functional layer. The connection element can also be provided for the transfer of information from an external unit, for example an external controller, to the functional layer, in particular when the electrical display element is designed as a display or touch display.

It can be provided that the electrical display element is or comprises an e-ink display, and/or an LCD display, and/or an OLED display, and/or a TOLED display. E-ink displays (electronic ink) or e-paper are non-luminous displays that reflect light like normal paper. They are characterized by a high contrast and low energy consumption. There are various manufacturing processes, but mostly a technique based on electrophoresis is used. LCD displays (liquid crystal displays) are liquid crystal displays whose function is based on the fact that the direction of polarization of light is influenced by liquid crystals when an electrical voltage is applied. In contrast to the inorganic light emitting diodes used in LCD displays, TOLED/OLED displays ("transparent organic light emitting diode"/"organic light emitting diode") are used as display elements in the case of organic light emitting diodes or LECs ("light-emitting electrochemical cells"). The electrical display element can also be or comprise a touch display.

It can further be provided that the electrical display element is or comprises an illumination device. For example, the illumination device can be provided over the entire surface or partially in the functional layer or can form the functional layer.

It can also be provided that the leveling layer has one or more partial layers, the partial layers being applied to one another, in particular in an additive method, for example printed on and/or sprayed on and/or poured on, and/or applied on. It can also be provided that one or more of the partial layers, in particular after the application and/or depending on the respective application method, are ground or polished partial layers.

According to one embodiment variant of the invention, the leveling layer is in particular designed as an adhesion promoter between the decorative layer and the functional layer.

The decorative layer is preferably a colored layer or a tinted layer. For example, the front side of the decorative layer can be provided, at least partially, with one or more layers of paint, in particular coated and/or sprayed and/or printed, in an application method.

The molded part according to the invention is also explained in more detail below with regard to further features and advantages on the basis of the description of exemplary embodiments and with reference to the accompanying schematic drawings.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 2 shows a schematic sectional illustration of one exemplary embodiment of the molded part according to the invention.

DETAILED DESCRIPTION

Figure 1:
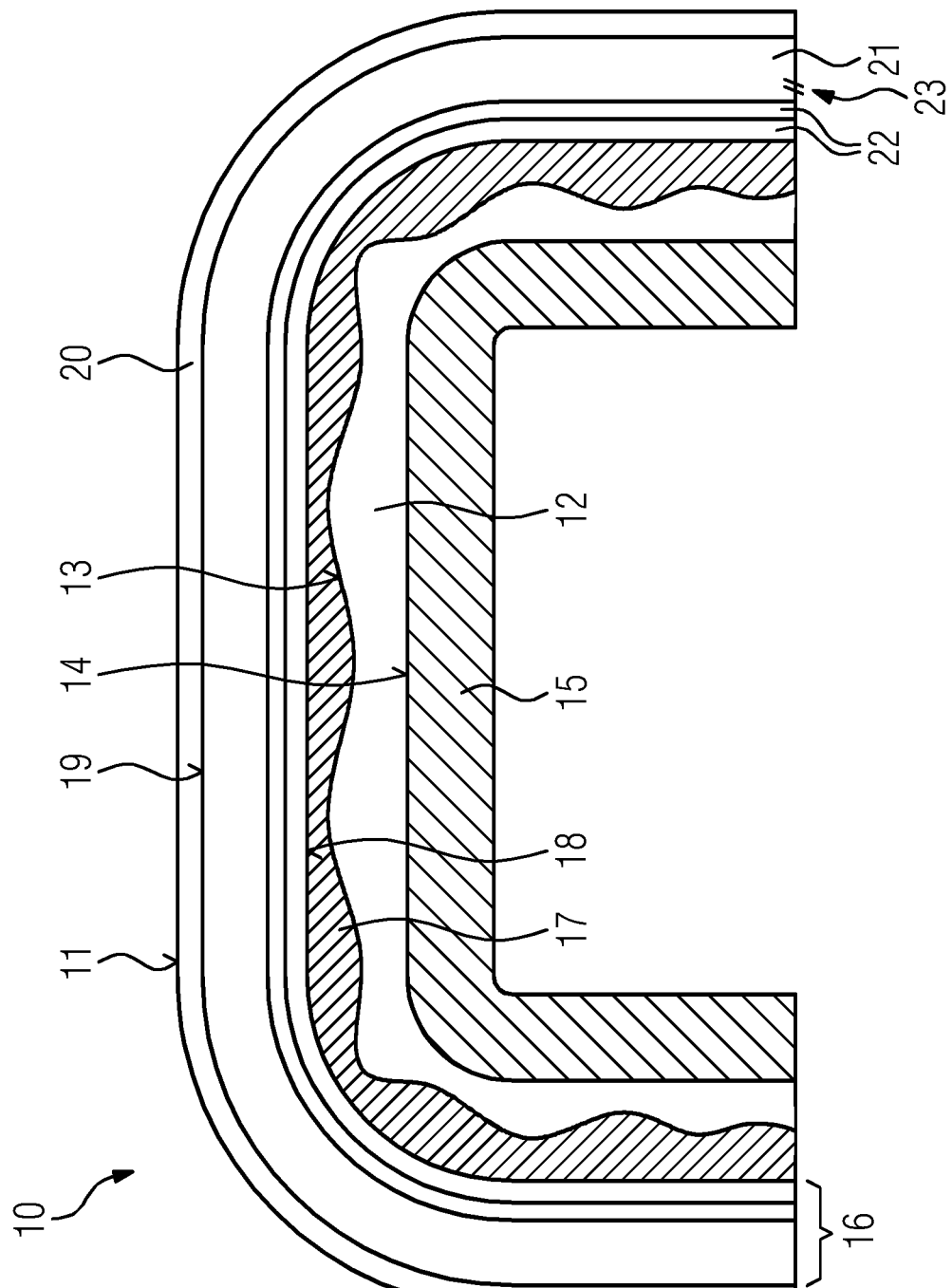
FIG. 1 shows a schematic sectional illustration of one exemplary embodiment of the molded part according to the invention.

FIG. 1 shows a molded part 10 with a front side 11 of the molded part designed as a visible side and a carrier 15 which is arranged on the rear side 14 of the decorative layer 12.

On the front side 13 of the decorative layer 12, a transparent leveling layer 17 is arranged to compensate for the irregular surface structure of the decorative layer 12. According to the exemplary embodiment of FIG. 1, the front side 18 of the leveling layer 17 forms a smooth substrate surface onto which the functional layer 16 can be applied. According to the exemplary embodiment of FIG. 2, an additional adhesion layer 24 is provided on the front side 18 of the leveling layer 17 as an adhesion promoter between the leveling layer 17 and the functional layer 16.

The functional layer 16 according to the exemplary embodiment according to FIG. 1 comprises two electrically conductive additional plies 22 and an LCD display as an electrical display element 21, which is arranged on the front side of the additional plies 22.

The functional layer 16 according to the exemplary embodiment according to FIG. 2 likewise comprises two electrically conductive additional plies 22 and an LCD display as an electrical display element 21, but here the LCD display is arranged between the two additional plies 22.

In the switched-on operating state, the display serves to display a surface image on the visible side 11 of the molded part 10. Patterns or symbols can thus be realized as an additional design view. If the display is switched off, the front side 13 of the decorative layer 12 on the visible side 11 of the molded part 10 can be seen through the transparent functional layer 16.

The functional layer 16 further includes a connection element 23 for the power supply of the electrical display element 21.

A transparent protective layer 20, which consists of a protective lacquer and forms the front side 11 of the molded part, is arranged on the front side 19 of the functional layer 16.

LIST OF REFERENCE NUMBERS 10 molded part
11 front side of the molded part
12 decorative layer
13 front side
14 rear side
15 carrier
16 functional layer
17 leveling layer
18 front side
19 front side
20 protective and/or optical layer
21 electrical display element
22 additional ply
23 connection element
24 adhesion layer

We claim:

1. A molded part having a molded part front side designed as a visible side, comprising:
    a decorative layer with a front side and a rear side opposite the front side;
    a carrier arranged on the rear side of the decorative layer; and
    a functional layer arranged on the front side of the decorative layer;
    wherein:

the functional layer is or comprises an electrical display element;

the electrical display element is designed, in a switched-on operating state, for displaying a surface image and/or for realizing a display function, and/or for realizing an illumination function on the visible side of the molded part; and the electrical display element is at least largely transparent and/or translucent when the operating state is switched off, so that the front side of the decorative layer is visible through the functional layer on the visible side of the molded part; and the decorative layer has an irregular surface structure on the front side thereof; and on the front side of the decorative layer, a leveling layer, which is either transparent or translucent, is arranged to compensate for the irregular surface structure of the decorative layer.

2. The molded part according to claim 1, wherein:
the leveling layer is provided between the decorative layer and the functional layer in order to form a smooth substrate surface for the functional layer with the front side of the leveling layer.

3. The molded part according to claim 1, wherein:
a transparent or translucent protective and/or optical layer is arranged on the front side of the functional layer.

4. The molded part according to claim 1, wherein:
the functional layer comprises one or more additional plies;

the electrical display element is arranged on the front side of the one or more additional plies of the functional layer; and the electrical display element extends partially or completely over the front side of the one or more additional plies of the functional layer.

5. The molded part according to claim 1, wherein:
the functional layer comprises at least two additional plies;

the electrical display element is arranged between the at least two additional plies of the functional layer; and the electrical display element extends partially or completely over the front side of an additional ply and on the rear side of an additional ply of the functional layer.

6. The molded part according to claim 4, wherein:
the at least one additional ply is an electrically conductive layer.

7. The molded part according to claim 1, wherein:
the functional layer is or comprises a functional film.

8. The molded part according to claim 1, wherein:
the functional layer comprises at least one connection element for applying current to the functional layer.

9. The molded part according to claim 1, wherein:
the electrical display element is or comprises an e-ink display and/or an LCD display and/or an OLED display.

10. The molded part according to claim 1, wherein:
the leveling layer has partial layers, wherein the partial layers are applied on top of one another.

11. The molded part according to claim 1, wherein:
the leveling layer is designed as an adhesion promoter between the decorative layer and the functional layer.

* * * * *